United States Patent Office 3,100,770
Patented Aug. 13, 1963

3,100,770
5-PYRIDYL-1,4-BENZODIAZEPINE COMPOUNDS
Rodney Ian Fryer, West Orange, Robert August Schmidt, Wallington, and Leo Henryk Sternbach, Upper Montclair, N.J., assignors to Hoffmann-La Roche Inc., Nutley, N.J., a corporation of New Jersey
No Drawing. Filed Aug. 11, 1961, Ser. No. 130,757
8 Claims. (Cl. 260—239.3)

This application relates to a group of novel medicinally valuable pyridine compounds and intermediates therefor. The novel medicinally acceptable pyridine compounds of this invention are benzodiazepine compounds directly joined in the 5-position to a cyclic carbon atom of the pyridine nucleus. More particularly the novel medicinally valuable compounds of the invention are selected from the group consisting of 7-$R_4$-5-pyridyl-1-$R_1$-3-$R_3$-3H-1,4-benzodiazepin-2(1H)-one, acid-addition salts thereof, 7-$R_4$-5-pyridyl-1-$R_1$-3-$R_3$-3H-1,4-benzodiazepin-2(1H)-one 4-oxide, acid-addition salts thereof, 7-$R_4$-5-pyridyl-2-($R_2$-amino)-3-$R_3$-3H-1,4-benzodiazepine 4-oxide, and acid-addition salts thereof; wherein $R_1$, $R_2$, and $R_3$ are each selected from the group consisting of hydrogen and lower alkyl, and $R_4$ is selected from the group consisting of hydrogen, halogen, and nitro.

The compounds referred to above as 7-$R_4$-5-pyridyl-2-($R_2$-amino)-3-$R_3$-3H-1,4-benzodiazepine 4-oxides are of the formula (I) 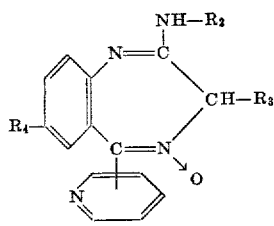

wherein $R_2$ and $R_3$ are selected from the group consisting of hydrogen and lower alkyl, and $R_4$ is selected from the group consisting of hydrogen, halogen, and nitro.

The compounds referred to above as 7-$R_4$-5-pyridyl-1-$R_1$-3-$R_3$-3H-1,4-benzodiazepin-2(1H)-one 4-oxides are of the formula (II) 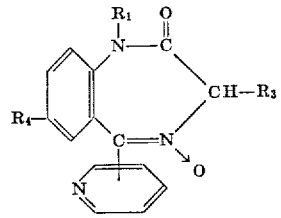

wherein $R_1$ and $R_3$ are selected from the group consisting of hydrogen and lower alkyl, and $R_4$ is selected from the group consisting of hydrogen, halogen, and nitro.

The compounds referred to above as 7-$R_4$-5-pyridyl-1-$R_1$-3-$R_3$-3H-1,4-benzodiazepin-2(1H)-ones are of the formula (III) 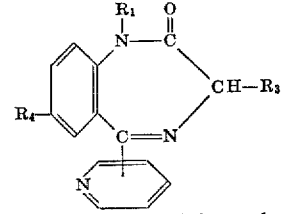

wherein $R_1$ and $R_3$ are selected from the group consisting of lower alkyl and hydrogen, and $R_4$ is selected from the group consisting of hydrogen, halogen, and nitro.

As used herein, the term "lower alkyl" includes both straight and branched chained carbon-hydrogen containing radicals, such as methyl, ethyl, propyl, isopropyl, butyl, isobutyl, and the like. The term "halogen" includes all four halogens, i.e., iodine, bromine, chlorine, and fluorine. As set forth above, the novel medicinally valuable pyridine compounds of the invention (represented by Formulas I, II, and III above) form acid-addition salts. More particularly they form medicinally acceptable acid-addition salts with pharmaceutically acceptable acids including both inorganic and organic acids, such as hydrochloric acid, hydrobromic acid, nitric acid, sulfuric acid, acetic acid, formic acid, succinic acid, maleic acid, p-toluene sulfonic acid, and the like.

The novel compounds of the invention represented by Formulas I, II, and III above can be made via a variety of reaction routes, utilizing as a starting material a (2-aminobenzoyl)-pyridine.

One reaction route of preparing compounds of Formula I above comprises reacting (2-aminobenzoyl)-pyridine or a corresponding compound bearing a halo or nitro substituent in the 5-position of the phenyl radical, with hydroxylamine to form the corresponding oxime derivative of the formula (IV) 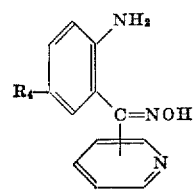

wherein $R_4$ has the same meaning as above.

The oxime of Formula IV above is then haloacetylated with a haloacetyl halide to yield a (2-haloacetamidobenzoyl)-pyridine oxime of the formula (V) 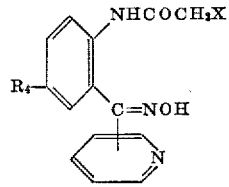

wherein $R_4$ has the same meaning as above, and X is halogen.

This compound upon treatment with acid agents dehydrates to form the corresponding 6-$R_4$-2-halomethyl-4-pyridyl-quinazoline 3-oxide of the formula (VI) 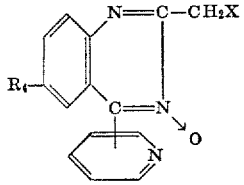

wherein $R_4$ and X have the same meaning as above.

This quinazoline of Formula VI above upon treatment with ammonia or mono-lower alkylamine yields a compound corresponding to Formula I above. Alternatively, the quinazoline of Formula VI above can be treated with an alkaline material, such as an inorganic base or a quaternary ammonium base, to yield a compound corresponding to Formula II above. Exemplary of inorganic bases which can be used are alkali metal hydroxides, such as sodium hydroxide, or alkaline earth metal hydroxides. Advantageously, the reaction with the inorganic base is conducted in the presence of an inert organic solvent such as alcohol, acetone, dioxane or the like. It is also possible to use a quaternary ammonium base, preferably in the form of an anion exchange resin, as the alkaline material.

Compounds corresponding to Formula III above can be directly synthesized by reacting a (2-aminobenzoyl)-pyridine with an amino acid of the formula (VII)

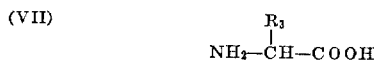

wherein $R_3$ has the same meaning as above, or a lower-alkyl ester thereof.

Thus when glycine or a glycine lower alkyl ester is used, the compound formed corresponding to Formula III above will have $R_3$ as hydrogen.

Another route of making compounds of Formula III above is to first react the (2-aminobenzoyl)-pyridine with a haloacetylating agent of the formula (VIII)

wherein $R_3$ has the same meaning as above and X is halogen.

This reaction will yield a [2-(α-halo)-lower alkanoyl-aminobenzoyl]-pyridine of the formula (IX)

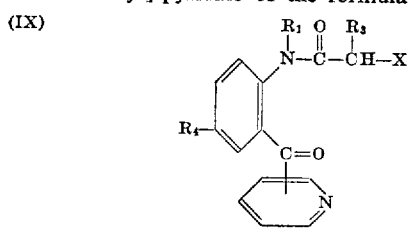

wherein $R_1$, $R_3$, and $R_4$ have the same meaning as above, and X is halogen.

This compound need not be isolated, but the reaction mixture containing it can be directly treated with ammonia to form a compound of the formula (X)

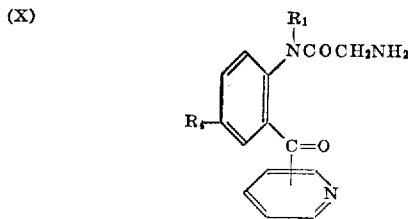

wherein $R_1$ and $R_4$ have the same meaning as above.

The compounds of Formula X above can be ring closed to the corresponding compound of Formula III above either by being permitted to stand at room temperature; by the application of heat; by treatment with base, such as ammonia; or by both application of heat and treatment with base. The compound of Formula X above need not be isolated prior to ring closure but the ring closure to the compound of Formula III above can be effetced in situ in the reaction mixture containing the compound of Formula X.

Yet another route of forming compounds corresponding to Formula III above is to react the (2-aminobenzoyl)-pyridine with carbobenzoxyglycine thereby forming a compound of the formula (XI)

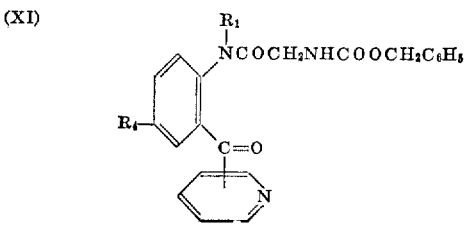

wherein $R_1$ and $R_4$ have the same meaning as above.

The compound corresponding to Formula XI above is then treated with a hydrobromic acid-acetic acid mixture to hydrolyze the carbobenzoxy group to a compound corresponding to Formula X above, which then, either with or without isolation, can be converted as described above into the corresponding compound of Formula III above.

The substituent denoted $R_4$ in Formulas I, II, and III above can be obtained as other than hydrogen by treatment of the starting material (2-aminobenzoyl)-pyridine or by treatment of the end-product benzodiazepine. Thus, for example, a (2-aminobenzoyl)-pyridine can be directly halogenated or nitrated or can be halogenated and nitrated by conversion to (2-acetaminobenzoyl)-pyridine, which can be halogenated or nitrated to a compound of the formula (XII)

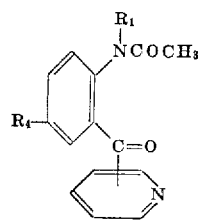

wherein $R_1$ has the same meaning as above, and $R_4$ is selected from the group consisting of halogen and nitro, which in turn can then be hydrolyzed to the corresponding (2-amino-5-substituted-benzoyl)-pyridine intermediate of the formula (XIII)

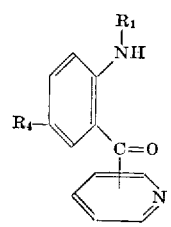

wherein $R_1$ has the same meaning as above, and $R_4$ is selected from the group consisting of halogen and nitro.

In addition to nitrating or halogenating the end-product benzodiazepine corresponding to Formulas I, II, and III above wherein $R_4$ is hydrogen, said benzodiazepines wherein $R_1$ is hydrogen can also be alkylated so that $R_1$ is lower alkyl.

The novel medicinally valuable compounds of this invention conforming to Formulas I, II, and III above are useful as sedatives, muscle relaxants, and anticonvulsants. They can be administered internally, for example orally or parenterally, and can be compounded into conventional pharmaceutical dosage forms, with dosage adjusted to individual requirements, such as capsules, tablets, suppositories, suspensions, solutions, and the like.

The following examples are illustrative but not limitative of the invention. All temperatures are stated in degrees centigrade.

*Example 1*

32.8 g. of 2-(2-aminobenzoyl)-pyridine and 200 cc. of acetic anhydride were stirred at room temperature for 3 hours and then permitted to stand overnight. Evaporation to dryness and digestion of the residue with 200 cc. of water containing a little sodium bicarbonate to make the pH slightly alkaline gave 2-(2-acetamidobenzoyl)-pyridine as a light tan powder, which upon crystallization from methanol formed colorless crystals melting at 151–153°.

Example 2

A solution of 8.6 cc. of bromine in 100 cc. of acetic acid was added slowly over a 3.5 hour period to a stirred solution of 38.5 g. of 2-(2-acetamidobenzoyl)-pyridine in 250 cc. of acetic acid. The dark solution was stirred for another 3 hours, permitted to stand overnight, stirred for 1 hour with $N_2$ sweeping, and evaporated at diminished pressure in the hood. The gummy residue (75 g.) was treated with water and ether, made alkaline with dilute sodium bicarbonate solution, and separated. Both phases contained undissolved product which was filtered off. Additional crops were obtained by further extraction of the aqueous phase with ether and evaporation of the resulting ether solutions. All these materials were recrystallized from methanol (decolorizing carbon added) yielding 2-(2-acetamido-5-bromobenzoyl)-pyridine as yellow crystals melting at 131.5–133°.

Example 3

20.85 g. of 2-(2-acetamido-5-bromobenzoyl)-pyridine in 250 cc. of 20% hydrochloric acid in ethanol were heated to reflux for 2 hours. 100 cc. of alcohol were added after one hour to maintain fluidity. The mixture stood overnight, was chilled and filtered to give 20.5 g. of colorless crystalline 2-(2-amino-5-bromobenzoyl)-pyridine hydrochloride. Digestion of this hydrochloride with 0.5 liter hot water hydrolyzed this product to the free base, 2-(2-amino-5-bromobenzoyl)-pyridine which formed yellow crystals, melting at 98–100°.

Evaporation of the alcoholic mother liquor, water digestion of the residue, and alkalization of the water digests afforded additional crops of 2-(2-amino-5-bromobenzoyl)-pyridine.

Example 4

2 g. of 2-(2-aminobenzoyl)-pyridine and 2.1 g. of glycine ethyl ester hydrochloride in 100 cc. of pyridine were refluxed for 4 hours and then 50 cc. of pyridine distilled off. Another 2.1 g. of glycine ester salt and 50 cc. of pyridine were added, and reflux resumed for 4 hours, followed by distillation of 60 cc. of pyridine. The residual dark solution was evaporated at diminished pressure to a dark solid residue, to which was added water and 50 cc. of benzene. Separation, extraction of the aqueous layer with another 50 cc. of benzene, washing of the combined benzene extracts with 50 cc. of water, concentration to 25 cc., and addition of 25 cc. petroleum ether to the benzene solution gave, on chilling, crude brown crystals. The aqueous layer from extraction deposited, on standing, a tan powder. These two products were combined and crystallized twice from acetone yielding tan crystals of 5-(2-pyridyl)-3H-1,4-benzodiazepin-2(1H)-one melting at 231–232° dec. The acetone crystallization mother liquors yielded further product.

Example 5

2.12 g. of bromoacetyl bromide were dissolved in anhydrous ether (C.P.) to a total volume of 12 cc. Portions of this solution were added alternately with equivalent amounts of 1 N sodium hydroxide (total of 10.5 cc.) to 1.4 g. of 2-(2-aminobenzoyl)-pyridine, stirred in 50 cc. of ether. The mixture was kept as close to neutral as possible. The final mixture was separated and the ether layer washed several times with water, dried with anhydrous sodium sulfate, and evaporated. The oily residue was treated with about 40 cc. of 15% ammonia in methanol and after one hour, filtered and evaporated. The semi-solid residue was digested with water and ether. Some solid remained undissolved. The solvents were separated, and the aqueous layer washed twice more with ether. Filtration of the undissolved material from the aqueous portion gave a small amount of greenish solid, which upon recrystallization from acetone gave 5-(2-pyridyl)-3H-1,4-bendodiazepin-2(1H)-one as colorless crystals, melting at 230–231° dec.

Example 6

1 g. of 2-(2-amino-5-bromobenzoyl)-pyridine and 0.75 g. of glycine ethyl ester hydrochloride in 100 cc. pyridine were refluxed for 4.5 hours. 55 cc. of pyridine were then distilled off over a 3-hour period. Another 0.75 g. of glycine ester salt and 75 cc. of pyridine were added, and refluxing resumed for 2 hours, followed by slow distillation of 80 cc. of pyridine over a 2-hour period. The concentrated solution was evaporated at diminished pressure to a dark fluid residue, to which 25 cc. of benzene and 25 cc. of water were added. The benzene layer was drawn off, washed with 25 cc. of water, diluted with 25–30 cc. of petroleum ether, and chilled yielding tan crystals, which upon crystallization from acetone (decolorizing carbon added) gave 7-bromo-5-(2-pyridyl)-3H-1,4-benzodiazepin-2(1H)-one as colorless crystals melting at 237–238.5° dec. Further processing of the mother liquors yielded additional product.

Example 7

1.09 g. of bromoacetylbromide was dissolved in anhydrous ether (C.P.) to a total volume of 30 cc. and 5.4 cc. of 1 N sodium hydroxide were diluted with water to 6 cc. total volume. Equivalent amounts of these solutions were added alternately to 1 g. of 2-(2-amino-5-bromobenzoyl)-pyridine, stirred in 50 cc. of ether, and the final mixture treated with ice. The ether layer was separated, washed with water, dried, and evaporated. The residue was mixed with 75 cc. of 20.3% ammonia in methanol. After 2 days, the solvent was evaporated, and the residue digested with ether and water. The water layer, containing some undissolved solid, was drawn off and filtered to give a tan solid, which upon crystallization twice from acetone gave tan crystals of 7 - bromo - 5 - (2 - pyridyl) - 3H - 1,4 - benzodiazepin - 2(1H)-one, melting at 238–240° dec. Evaporation of the ether layer and processing of the various mother liquors afforded additional product.

Example 8

1.36 g. of chlorine, dissolved in 50 g. of glacial acetic acid, were added over a fifteen-minute period to a cold, stirred solution of 3.57 g. of 2-o-aminobenzoylpyridine in 25 cc. of glacial acetic acid. After stirring for fifteen minutes, the solution was left overnight at room temperature and then evaporated at diminished pressure. The dark red, oily residue was digested briefly on the steam bath with 50 cc. of water and then stirred at room temperature. Most of the gum dissolved, and the mixture, after standing for 3.5 days, deposited a yellow solid, which on crystallization from 40 cc. of ligroin (B.P. 90–120°) gave 2-(2-amino-5-chlorobenzoyl)-pyridine as golden-yellow crystals, M.P. 98.5–101°.

Example 9

To a solution of 4.66 g. of 2-(2-amino-5-chlorobenzoyl)-pyridine in 150 cc. of glacial acetic acid were added 1.8 ml. of bromoacetylbromide. The system was protected by a drying tube of anhydrous calcium chloride and the solution stirred for several hours. Evaporation at diminished pressure left a red oil, which was mixed with 225 cc. of liquid ammonia at —70°. The solution which formed was permitted to stand overnight at room temperature to allow slow evaporation of ammonia. The solid residue was stirred with 100 cc. of water, chilled, and filtered to yield a green powder. The product was recrystallized from 150 cc. of alcohol to give 7-chloro-5-(2-pyridyl)-3H-1,4-benzodiazepin-2(1H)-one as yellow crystals, M.P. 224.5–225.5° dec.

Example 10

11.2 g. of 5-(2-pyridyl)-3H-1,4-benzodiazepin-2(1H)-one were dissolved in 100 cc. of cold concentrated sulfuric acid and stirred at 5°. A solution of 5.04 g. of potassium nitrate in 30 cc. of concentrated sulfuric acid was then added slowly over a one-hour period. After stirring an additional 1.5 hours at 5°, the nitration mixture was poured onto ice in a vessel cooled by an ice-salt bath. The resultant clear yellow solution was stirred at 5° while adding 450 cc. of concentrated ammonium hydroxide. The final pH was about 8.0. Filtration of the precipitate yielded a crude, pale yellow solid, which was recrystallized from about 1.1 liter alcohol (a little water was added to effect final solution) to yield 7 - nitro - 5 - (2 - pyridyl) - 3H - 1,4 - benzodiazepin-2(1H)-one as colorless crystals which upon further crystallization first from alcohol and then from acetone melted at 253.5–254.5° dec.

Example 11

7.5 g. of 7-bromo-5-(2-pyridyl)-3H-1,4-benzodiazepin-2(1H)-one were dissolved in 375 cc. dimethylformamide. To the pale yellow solution were added 1.3 g. of sodium methylate, with stirring at 5°. The solution darkened to brown-yellow and was stirred at 5° for two hours, during which time turbidity developed and a precipitate gradually formed. 1.5 ml. of methyl iodide were then added from a pipette. A clear solution soon re-formed and the color lightened. After two hours of stirring at 5°, the slightly turbid solution was evaporated at diminished pressure to a viscous residue, which was transformed to a semi-solid crystalline mass on standing overnight. The residue was stirred with 100 cc. of water for four hours, and the mixture chilled and filtered to give a tan powder which upon crystallization from 30 cc. of alcohol yielded 7-bromo-1-methyl-5-(2-pyridyl)-3H-1,4-benzodiazepin-2(1H)-one as tan crystals which upon further crystallization from ethyl acetate melted at 135.5–137°.

Example 12

To a solution of 14.25 g. of 2-(2-amino-5-bromobenzoyl)-pyridine in 0.7 liter of glacial acetic acid were added, over a ten minute period with stirring at room temperature, 5.7 ml. of α-bromopropionyl bromide. The initial red solution became very dark and, after stirring for 3.5 hours, the clear dark brown solution was evaporated at diminished pressure. The residual brown oil was mixed with 0.5 liter of liquid ammonia and the mixture permitted to stand overnight. The solid remaining after ammonia exaporation was digested with 0.5 liter of water. Chilling and filtration gave a crude product which was recrystallized from 300 cc. of benzene yielding 7-bromo-3-methyl-5-(2-pyridyl)-3H-1,4-benzodiazepin-2(1H)-one as a cream crystalline powder which upon further crystallization from benzene and finally from acetone melted at 227.5–229° dec.

Example 13

48 g. of 2-(2-amino-5-bromobenzoyl)-pyridine, 28.1 g. of hydroxylamine hydrochloride, and 260 cc. alcohol were refluxed for twenty-two hours. The solution was then chilled, concentrated at diminished pressure to 100 cc. volume, and diluted with an equal volume of water. The solution was stirred and neutralized with approximately 150 cc. 3 N sodium carbonate. To the resulting slurry were added 100 cc. of water and 200 cc. of benzene. After stirring for sixteen hours, 200 cc. of petroleum ether were added and agitation continued for 2.5 hours. Chilling and filtration yielded 2-(2-amino-5-bromobenzoyl)-pyridine oxime as a tan powder which upon crystallization from benzene melted at 163–165.5° (not sharp).

Example 14

To 5.84 g. of 2-(2-amino-5-bromobenzoyl)-pyridine oxime dissolved in 50 cc. of acetic acid, were added 1.6 ml. of chloroacetyl chloride. After initial cooling, the solution was stirred for eighteen hours at room temperature. The final mixture, containing a cream precipitate, was evaporated at diminished pressure to a tan solid residue, which was suspended in 50 cc. of water and neutralized with aqueous sodium carbonate while stirring at 5°. Filtration gave a crude product which upon crystallization from 100 cc. of alcohol yielded 2-(2-chloroacetamido-5-bromobenzoyl)-pyridine oxime as slightly pink crystals, which upon being further recrystallized from alcohol, melted at 166.5–168° dec.

Example 15

0.4 ml. of chloroacetyl chloride was added to 1.46 g. of 2-(2-amino-5-bromobenzoyl)-pyridine oxime in 10 cc. of glacial acetic acid, with stirring at 5°. After stirring overnight at room temperature, dry hydrogen chloride was passed into the slightly turbid, brown solution for three hours at 5°. The solution was then stirred overnight at room temperature and evaporated at diminished pressure to a yellow oil, to which were added 20 cc. of methylene chloride. Upon stirring a brown gummy lump formed in the yellow liquor. Addition of 25 cc. of cold 3 N sodium carbonate and agitation for one hour failed to dissolve the gum. The liquor was then decanted and separated and the aqueous layer extracted with methylene chloride. The combined organic layers were washed with water, dried over anhydrous sodium sulfate, and evaporated to give a yellow solid, which was recrystallized from 50 cc. of alcohol yielding 2-chloromethyl-4-(2-pyridyl)-6-bromo-quinazoline 3-oxide as yellow crystals, M.P. 206° dec. Additional product was isolated by alcohol recrystallization of the gum.

Example 16

3.8 g. 2-(2-chloroacetamido-5-bromobenzoyl)-pyridine oxime were dissolved in 75 cc. glacial acetic acid and dry hydrogen chloride introduced for six hours with stirring at 5°. The solution was left overnight at room temperature and then evaporated at diminished pressure to a yellow oil, to which were added 50 cc. each of methylene chloride and 3 N sodium carbonate. The mixture was agitated for one hour and filtered. The filtrate was separated and the aqueous layer extracted twice with methylene chloride. The combined organic layers were washed with water, dried with anhydrous sodium sulfate, and evaporated at diminished pressure. The residual yellow solid was dissolved in 150 cc. boiling alcohol (decolorizing carbon added), and the solution filtered and concentrated to a volume of 100 cc. Chilling precipitated a crude product which was stirred for 0.5 hour at 5° with 5 cc. 3 N sodium carbonate. Filtration and recrystallization from 150 cc. alcohol gave 2-chloromethyl-4-(2-pyridyl)-6-bromo-quinazoline 3-oxide as pale yellow crystals, M.P. 209° dec.

Concentration of the recrystallization mother liquor to about 50 cc. yielded additional product.

Example 17

3.04 g. 2-chloromethyl-4-(2-pyridyl)-6-bromoquinazoline 3-oxide and 100 cc. methanolic methylamine (15–20%) were mixed at room temperature and stirred for twenty-two hours. A clear, red-brown solution formed within a short time and then gradually assumed a yellow color. The solution was filtered to remove a few particles of dirt and evaporated at diminished pressure. The residue was dissolved in methylene chloride, and the solution washed with water, dried with anhydrous sodium sulfate, and evaporated. The gummy residue was taken up in 50 cc. boiling acetone (decolorizing carbon added), and the solution chilled and diluted with 20 cc. petroleum ether, added in 5 cc. portions. The resultant precipitate, on filtration, consisted of 7-bromo-2-methylamino-5-(2-pyridyl)-3H-1, 4-benzodiazepine 4-oxide. The cream, crystalline product was recrystallized from acetone and melted at 231–233° dec.

Example 18

A mixture of 4-(2-aminobenzoyl)-pyridine (19.8 g.) in acetic anhydride (200 cc.) and concentrated sulfuric acid (0.1 cc.) was allowed to stand at room temperature for four hours. The mixture was concentrated at 80° under reduced presure to an oil. The residue was dissolved in benzene (100 cc.), washed with 3 N sodium hydroxide solution (2 x 50 cc.), saturated brine solution (2 x 50 cc.) and concentrated to a small volume. The crystals were filtered yielding 4-(2-acetamidobenzoyl)-pyridine as white prisms melting at 161-162°.

Example 19

A mixture of 4-(2-aminobenzoyl)-pyridine (5.0 g.) and carbobenzoxyglycine (5.3 g.) in methylene chloride (200 cc.) was cooled to 19°. N,N'-dicyclohexylcarbodiimide (5.2 g.) was added and the solution stirred for two hours. The mixture was then refrigerated for three days and N,N'-dicyclohexyl urea was filtered off and discarded. The methylene chloride solution was concentrated in vacuo at room temperature to a mixture of oil and crystals. The residue was dissolved in benzene and after filtration was chromatographed through a column of florisil (90 g.) The benzene fractions were discarded and the eluent changed to ether. The ether fractions gave [2 - (4 - pyridylcarbonyl)phenyl]carbamoylmethylcarbamic acid benzyl ester as white needles which were recrystallized from benzene/petroleum ether and melted at 130-130.5°.

Example 20

A solution of hydrogen bromide in glacial acetic acid (33% wt./wt.) (20 cc.) was added dropwise, at room temperature, to a stirred solution of [2-(4-pyridylcarbonyl)phenyl]-carbamoylmethylcarbamic acid benzyl ester (3.5 g.) in glacial acetic acid (10 cc.). When the addition was complete the mixture was stirred an additional four hours and diluted with 1 liter of ethyl ether. The precipitate was filtered, dissolved in water (100 cc.) and the solution brought to pH 8 with concentrated ammonium hydroxide solution. The resulting precipitate was filtered and recrystallized from benzene to give 5-(4-pyridyl)3H-1,4-benzodiazepin-2(1H)-one as white needles melting at 206-207°.

Example 21

A solution of 4-(2-aminobenzoyl)-pyridine (5.0 g.) in N,N-dimethyl formamide (20 cc.) was saturated with hydrogen bromide. To the resulting mixture, bromoacetyl bromide (5.1 g.), was added dropwise with stirring. A solution of pyridine (4.0 g.) in N,N-dimethylformamide (5 cc.) was added over a five minute period. The mixture was allowed to stir for seven hours, when approximately 300 cc. of liquid ammonia was carefully added. The ammonia was allowed to evaporate overnight and the reaction mixture was taken up in benzene (100 cc.). Ammonium bromide was filtered off and discarded and the benzene solution washed with water (3 x 100 cc.) and evaporated to an oil under reduced pressure. The product was crystallized from a benzene/ether mixture to give 4-(2-aminoacetamidobenzoyl)-pyridine melting at 122-125°, which on recrystallization from acetone/hexane spontaneously ring closed to give white needles.

Example 22

4-(2-aminobenzoyl)-pyridine (16 g.) was dissolved in glacial acetic acid and a solution of bromoacetylbromide (20.1 g.) in glacial acetic acid (10 cc.) was added dropwise. The resulting solution was stirred overnight and the acetic acid removed under reduced pressure. Liquid ammonia, approximately 500 cc. was carefully added to the residue and allowed to evaporate. The reaction mixture was then taken up in methylene chloride (250 cc.) washed with 1 N sodium hydroxide (3 x 50 cc.), water (3 x 100 cc.), saturated brine solution (2 x 100 cc.), dried over anhydrous sodium sulfate, treated with decolorizing carbon and filtered. The solvent was removed under reduced pressure and the crystalline mass was recrystallized from benzene to give 5-(4-pyridyl)-3H-1,4-benzodiazepin-2(1H)-one as white needles.

Example 23

A solution of potassium nitrate (2.53 g.) in concentrated sulfuric acid (15 cc.) was added dropwise at 0° to a solution of 5-(4-pyridyl)-3H-1,4-benzodiazepin-2(1H)-one (6.0 g.) in concentrated sulfuric acid (30 cc.). The reaction mixture was stirred at 0° for two hours and then 150 g. of crushed ice was carefully added. The solution was kept at 0° and brought to pH 8 by the addition of about 150 cc. of concentrated ammonium hydroxide solution. The mixture was extracted with methylene chloride (3 x 100 cc.), the organic layers were combined and washed with water (3 x 100 cc.) and saturated brine solution (2 x 100 cc.). After drying over anhydrous sodium sulfate and filtering, the solvent was removed under reduced pressure. Recrystallization of the residue from acetone gave 7-nitro-5-(4-pyridyl)-3H-1,4-benzodiazepin-2(1H)-one as pale yellow needles melting at 242-242.5°.

Example 24

A solution of the 4-(2-aminobenzoyl)-pyridine (30 g.) in glacial acetic acid (200 cc.) was cooled to 5° in an ice-salt bath. To this was added dropwise with stirring a solution of bromine (25 g.) in glacial acetic acid (5 cc.). The mixture was stirred for ten minutes, diluted with water (300 cc.) and made alkaline with sodium hydroxide pellets. The crystalline residue was filtered and washed with water. The mixture of brominated ketones was dissolved in benzene and the water removed by azeotropic distillation. The benzene solution was concentrated to a small volume and chromatographed on a column of Grade I alumina (Woelm neutral) (300 g.). Elution was 50% benzene/ether (v./v.), gave 4-(5-bromo-2-aminobenzoyl)-pyridine as yellow prisms which upon crystallization from chloroform melted at 213-214°.

Example 25

A solution of 13 g. of 4-(2-amino-5-bromobenzoyl)-pyridine in 50 cc. of N,N-dimethylformamide was saturated with hydrogen bromide. Then 7.35 g. of bromoacetyl bromide was added to the mixture dropwise with stirring. A solution of 5.76 g. of pyridine in 5 cc. of N,N-dimethylformamide was then added thereto over a 5-minute period. The mixture was allowed to stir for 7 hours, when approximately 500 cc. of liquid ammonia was carefully added. The ammonia was allowed to evaporate overnight, and the reaction mixture was taken up in 300 cc. of benzene. Ammonium bromide was filtered off and discarded, and the benzene solution washed with water (3 x 100) and evaporated at reduced pressure to an oil, which upon crystallization from acetone formed white needles of 7-bromo-5-(4-pyridyl)-3H-1,4-benzodiazepin-2-(1H)-one, melting at 228-228.5°.

We claim:
1. A compound selected from the group consisting of 7-$R_4$-5-pyridyl-1-$R_1$-3-$R_3$-3H-1,4 - benzodiazepin - 2(1H)-one, medicinally acceptable acid-addition salts thereof, 7-$R_4$-5-pyridyl-1-$R_1$-3-$R_3$-3H-1,4-benzodiazepin-2(1H) - one 4-oxide, and medicinally acceptable acid-addition salts thereof, wherein $R_1$, $R_2$ and $R_3$ are selected from the group consisting of hydrogen and lower alkyl; and $R_4$ is selected from the group consisting of hydrogen, halogen, and nitro.

2. A compound of the formula

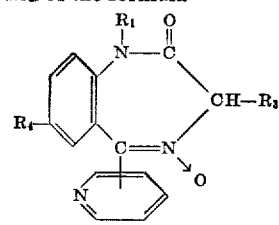

wherein $R_1$ and $R_3$ are selected from the group consisting of hydrogen and lower alkyl, and $R_4$ is selected from the group consisting of hydrogen, halogen and nitro.

3. A compound of the formula

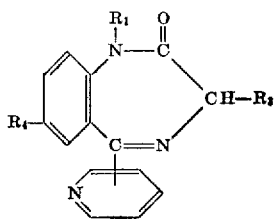

wherein $R_1$ and $R_3$ are selected from the group consisting of lower alkyl and hydrogen, and $R_4$ is selected from the group consisting of hydrogen, halogen, and nitro.

4. 7-bromo-5-(4-pyridyl)-3H-1,4-benzodiazepin-2(1H)-one.

5. 7-bromo-5-(2-pyridyl)-3H-1,4-benzodiazepin-2(1H)-one.

6. 7-chloro-5-(2-pyridyl)-3H-1,4-benzodiazepin-2(1H)-one.

7. 7-nitro-5-(2-pyridyl)-3H-1,4-benzodiazepin-2(1H)-one.

8. 7-bromo-1-methyl-5-2-(pyrridyl)-3H-1,4-benzodiazepin-2(1H)-one.

References Cited in the file of this patent
UNITED STATES PATENTS

| | | |
|---|---|---|
| 2,928,837 | Kallischnigg | Mar. 15, 1960 |
| 2,993,905 | Shapiro et al. | July 25, 1961 |
| 2,995,561 | Habicht | Aug. 8, 1961 |
| 2,998,421 | Doub et al. | Aug. 29, 1961 |
| 2,999,091 | Zaugg | Sept. 5, 1961 |

UNITED STATES PATENT OFFICE
CERTIFICATE OF CORRECTION

Patent No. 3,100,770                      August 13, 1963

Rodney Ian Fryer et al.

It is hereby certified that error appears in the above numbered patent requiring correction and that the said Letters Patent should read as corrected below.

Column 12, line 7, for "5-2-(pyrridyl)" read -- 5-(2-pyridyl) --.

Signed and sealed this 25th day of February 1964.

(SEAL)
Attest:
ERNEST W. SWIDER

Attesting Officer

EDWIN L. REYNOLDS

Acting Commissioner of Patents